(12) United States Patent
Moriwaki et al.

(10) Patent No.: US 10,533,890 B2
(45) Date of Patent: Jan. 14, 2020

(54) COMBINATION WEIGHING DEVICE INCLUDING A HALLOW SENSOR COVER AND RADIATION COMPARTMENTS

(71) Applicant: Ishida Co., Ltd., Kyoto (JP)

(72) Inventors: Takakazu Moriwaki, Ritto (JP); Shinya Ikeda, Ritto (JP); Toshiharu Kageyama, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 290 days.

(21) Appl. No.: 15/549,587

(22) PCT Filed: Feb. 3, 2016

(86) PCT No.: PCT/JP2016/053241
§ 371 (c)(1),
(2) Date: Aug. 8, 2017

(87) PCT Pub. No.: WO2016/129484
PCT Pub. Date: Aug. 18, 2016

(65) Prior Publication Data
US 2018/0038729 A1    Feb. 8, 2018

(30) Foreign Application Priority Data

Feb. 9, 2015    (JP) ................................. 2015-000579

(51) Int. Cl.
*G01G 19/393*    (2006.01)
*G01G 11/00*    (2006.01)
*G01G 13/24*    (2006.01)

(52) U.S. Cl.
CPC ........... *G01G 19/393* (2013.01); *G01G 11/00* (2013.01); *G01G 13/24* (2013.01)

(58) Field of Classification Search
CPC .... G01G 11/00; G01G 11/003; G01G 13/003; G01G 13/24; G01G 19/393
See application file for complete search history.

(56) References Cited

U.S. PATENT DOCUMENTS 4,515,231 A * 5/1985 Ishida .................. G01G 13/026
177/122
5,074,436 A * 12/1991 Inoue .................. G01G 13/247
177/25.18
(Continued)

FOREIGN PATENT DOCUMENTS

CN    86102867 A    10/1986
CN    1659419 A    8/2005
(Continued)

OTHER PUBLICATIONS

The extended European search report issued by the European Patent Office dated Aug. 10, 2018, which corresponds to European Patent Application No. 167491281-1001 and is related to U.S. Appl. No. 15/549,587.

(Continued)

*Primary Examiner* — Natalie Huls
(74) *Attorney, Agent, or Firm* — Studebaker & Brackett PC

(57) ABSTRACT

A combination weighing apparatus includes a distributing unit that distributes articles supplied from above, a plurality of radiation units that conveys the articles distributed from the distributing unit, a plurality of detection sensors disposed above the radiation units to detect the articles conveyed by the radiation units, a plurality of weighing units disposed below the radiation units on a downstream side in an article conveying direction to accumulate and weigh the articles, a controller that controls the distributing unit or the radiation units based on detection by the detection sensors, and a sensor cover that incorporates the plurality of detection sensors, and the sensor cover is disposed at a different position from an end portion of each of the radiation units on the downstream side when viewed in a vertical direction.

8 Claims, 5 Drawing Sheets

(56) References Cited

U.S. PATENT DOCUMENTS

| | | | | |
|---|---|---|---|---|
| 5,270,495 | A | * | 12/1993 | Mosher ................ G01G 13/026 177/25.18 |
| 5,613,590 | A | * | 3/1997 | Simionato ............ G01G 13/026 177/58 |
| 5,753,866 | A | * | 5/1998 | Ikeda ................... G01G 19/393 177/119 |
| 2004/0148056 | A1 | * | 7/2004 | Baranowski ............ B65B 37/04 700/240 |
| 2015/0021103 | A1 | * | 1/2015 | Tamai .................. G01G 19/393 177/25.18 |
| 2016/0209263 | A1 | * | 7/2016 | Otoshi ................ G01G 19/387 |
| 2016/0334265 | A1 | * | 11/2016 | Kageyama ............ G01G 19/00 |
| 2016/0341596 | A1 | * | 11/2016 | Hirose ................. G01G 19/393 |

FOREIGN PATENT DOCUMENTS

| | | |
|---|---|---|
| CN | 102997982 A | 3/2013 |
| JP | S58-193225 U | 12/1983 |
| JP | S61-034432 U | 3/1986 |
| JP | S61-147934 U | 9/1986 |
| JP | H05-330632 A | 12/1993 |
| JP | H06-043012 A | 2/1994 |
| JP | 2005-538433 A | 12/2005 |
| WO | 03/102501 A1 | 12/2003 |
| WO | 2013/179849 A1 | 12/2013 |

OTHER PUBLICATIONS

International Search Report issued in PCT/JP2016/053241; dated Apr. 19, 2016.

Notification of Transmittal of Translation of the International Preliminary Report on Patentability (Chapter I) and Translation of Written Opinion of the International Searching Authority; PCT/JP2016/053241; dated Aug. 24, 2017.

An Office Action mailed by the State Intellectual Property Office of the People's Republic of China dated Mar. 1, 2019, which corresponds to Chinese Patent Application No. 201680009084.2 and is related to U.S. Appl. No. 15/549,587.

Chen Qing Ray, "Application of combination weighing technology in weighing of traditional Chinese medicine", Science and Technology Information, 2011, No. 27, pp. 218-219, China Academic Journal Electronic Publishing House.

* cited by examiner

COMBINATION WEIGHING DEVICE INCLUDING A HALLOW SENSOR COVER AND RADIATION COMPARTMENTS

TECHNICAL FIELD

An aspect of the present invention relates to a combination weighing apparatus.

BACKGROUND ART

In a conventional combination weighing apparatus, the amount of articles conveyed by a distributing unit or a radiation unit was detected by a detection sensor. Based on the detected detection amount, supply control is performed on the distributing unit or the radiation unit, and combination weighing is performed.

In a device described in Patent Literature 1, detection is performed immediately above a distributing unit or a radiation unit, and the distributing unit or the radiation unit is driven when an average value of detection amounts is smaller than a reference value.

In addition, in a device described in Patent Literature 2, in order to supply a predetermined number of articles to a hopper provided downstream of a radiation unit, an optical sensor is provided at an end portion of the radiation unit on a downstream side, and the number of articles supplied from the radiation unit to the hopper is detected.

CITATION LIST

Patent Literature

Patent Literature 1: Japanese Unexamined Utility Model Publication No. S61-034432
Patent Literature 2: Japanese Unexamined Utility Model Publication No. S61-147934

SUMMARY OF INVENTION

Technical Problem

In any of the devices, the detection sensor is disposed above the radiation unit to detect the articles conveyed by the radiation unit, etc. In addition, because a plurality of objects is detected, a plurality of detection sensors is included. For this reason, a wire for driving the detection sensors or for delivering a detection result is wired to a main body of the device for each of the plurality of sensors.

Meanwhile, in the combination weighing apparatus, articles to be weighed are supplied to the distributing unit from above, and the articles are distributed and discharged to the radiation unit by the radiation unit. For this reason, the articles dropped from above fall and accumulate on a structure present above the distributing unit or the radiation unit.

In particular, when the articles are food and accumulate for a long time, the articles may be oxidized to degrade taste or flavor, or various germs may propagate. For this reason, the distributing unit, the radiation unit, or the structure present above the unit needs to be frequently cleaned.

However, in the devices of Patent Literature 1 and Patent Literature 2, a plurality of wires, etc. is present above the device, and thus a problem may occur in cleaning, etc.

An object of an aspect of the invention is to provide a device capable of improving cleanability even when a plurality of detection sensors for supply control is provided.

Solution to Problem

A combination weighing apparatus according to a first viewpoint of the invention includes a distributing unit that distributes articles supplied from above, a plurality of radiation units that conveys the articles distributed from the distributing unit, a plurality of detection sensors disposed above the radiation units to detect the articles conveyed by the radiation units, a plurality of weighing units disposed below the radiation units on a downstream side in an article conveying direction to accumulate and weigh the articles conveyed from the radiation units, a controller that controls the distributing unit or the radiation units based on detection by the detection sensors, and a sensor cover that incorporates the plurality of detection sensors, wherein the sensor cover is disposed at a different position from an end portion of each of the radiation units on the downstream side when viewed in a vertical direction.

According to the first viewpoint of the invention, the detection sensors are inhibited from being exposed by the sensor cover, and the articles supplied from above are inhibited from directly coming into contact with or staying on the detection sensors. For this reason, cleanability is improved while a decrease in detection accuracy is suppressed. Further, the sensor cover is disposed at the different position from the end portion of each of the radiation units on the downstream side when viewed in a vertical direction. For this reason, the radiation units or the weighing units disposed on the downstream side of the radiation units are easily removed at the time of cleaning. As a result, cleanability is improved.

In a combination weighing apparatus according to a second viewpoint of the invention, a detection surface of each of the detection sensors may be disposed on a lower surface of the sensor cover and inclined.

According to the second viewpoint of the invention, because the detection surface of each of the detection sensors is disposed on the lower surface of the sensor cover and inclined, the articles are inhibited from directly coming into contact with the detection surface. For this reason, cleanability is improved while a decrease in detection accuracy of the sensors is suppressed.

In a combination weighing apparatus according to a third viewpoint of the invention, an upper surface of the sensor cover may be an inclined flat surface.

According to the third viewpoint of the invention, because the upper surface of the sensor cover is the inclined flat surface, contact or stay of the articles dropped from above is suppressed. Further, a length of the sensor cover along the article conveying direction is shortened when compared to a case in which the upper surface is a curved surface. For this reason, contact or stay of the articles is suppressed. As a result, cleanability is improved.

In a combination weighing apparatus according to a fourth viewpoint of the invention, the sensor cover may be disposed on an upstream side with respect to the end portion on the downstream side of the radiation unit in the article conveying direction, and the upper surface may face the upstream side.

According to the fourth viewpoint of the invention, because the sensor cover is disposed on the upstream side with respect to the radiation unit in the article conveying direction, access from the downstream side of the weighing units or the radiation units is allowed when the weighing units or the radiation units are removed at the time of cleaning. For this reason, a wide removal space is obtained on the downstream side, and thus cleanability is improved.

In addition, the upper surface of the sensor cover faces the upstream side of the radiation units. For this reason, the articles dropped onto the upper surface are guided to the upstream side of the radiation units. As a result, a conveying distance of the articles becomes longer, and thus stable conveyance is allowed.

A combination weighing apparatus according to a fifth viewpoint of the invention further includes a support frame supporting the sensor cover, an upper surface of the support frame is an inclined flat surface, and a cross-sectional shape of the support frame may be an inverted V shape.

According to the fifth viewpoint of the invention, because the upper surface of the support frame is inclined, contact or stay of the articles is suppressed when compared to a case in which the upper surface is a curved surface. As a result, cleanability is improved. Further, because the cross-sectional shape of the support frame is the inverted V shape, rigidity of the support frame increases. For this reason, the detection sensors are reliably supported, and thus a decrease in detection accuracy may be prevented.

In a combination weighing apparatus according to a sixth viewpoint of the invention, the sensor cover may extend along a direction substantially orthogonal to the article conveying direction when viewed in a vertical direction.

According to the sixth viewpoint of the invention, the sensor cover extends along the direction substantially orthogonal to the article conveying direction when viewed in a vertical direction. For this reason, a wire may not be wired from a main body for each of the detection sensors as in the past. In other words, in the sensor cover, wires, etc. of the plurality of detection sensors incorporated in the sensor cover may be collectively wired. For this reason, the number of wire paths is reduced. As a result, cleanability is improved.

In a combination weighing apparatus according to a seventh viewpoint of the invention, the sensor cover may extend along the direction substantially orthogonal to the article conveying direction when viewed in a vertical direction, and the number of disposed wiring openings provided with the sensor cover and through which wires connected to the plurality of detection sensors pass may be smaller than the number of the disposed detection sensors.

According to the seventh viewpoint of the invention, articles come into contact with or stay at fewer positions when compared to a case in which wires corresponding to the same disposition number as the number of disposed sensors are provided as in a conventional device. For this reason, cleanability is improved.

A combination weighing apparatus according to an eighth viewpoint of the invention includes a distributing unit that distributes articles supplied from above, a plurality of radiation units that conveys the articles distributed from the distributing unit, a plurality of detection sensors disposed above the radiation units to detect the articles conveyed by the radiation units, a plurality of weighing units disposed below the radiation units on a downstream side in an article conveying direction to accumulate and weigh the articles conveyed from the radiation units, a controller that controls the distributing unit or the radiation units based on detection by the detection sensors, and a sensor cover that incorporates the plurality of detection sensors, wherein the sensor cover is not disposed above an end portion of each of the radiation units on the downstream side.

According to the eighth viewpoint of the invention, the detection sensors are inhibited from being exposed by the sensor cover, and the articles supplied from above are inhibited from directly coming into contact with or staying on the detection sensors. For this reason, cleanability is improved while a decrease in detection accuracy is suppressed. Further, the sensor cover is not disposed above the end portion of each of the radiation units on the downstream side in the article conveying direction. For this reason, the radiation units or the weighing units disposed on the downstream side of the radiation units are easily removed at the time of cleaning. As a result, cleanability is improved.

Advantageous Effects of Invention

According to an aspect of the invention, it is possible to provide a device capable of improving cleanability even when a plurality of detection sensors for supply control is provided.

DESCRIPTION OF EMBODIMENTS

Figure 1:
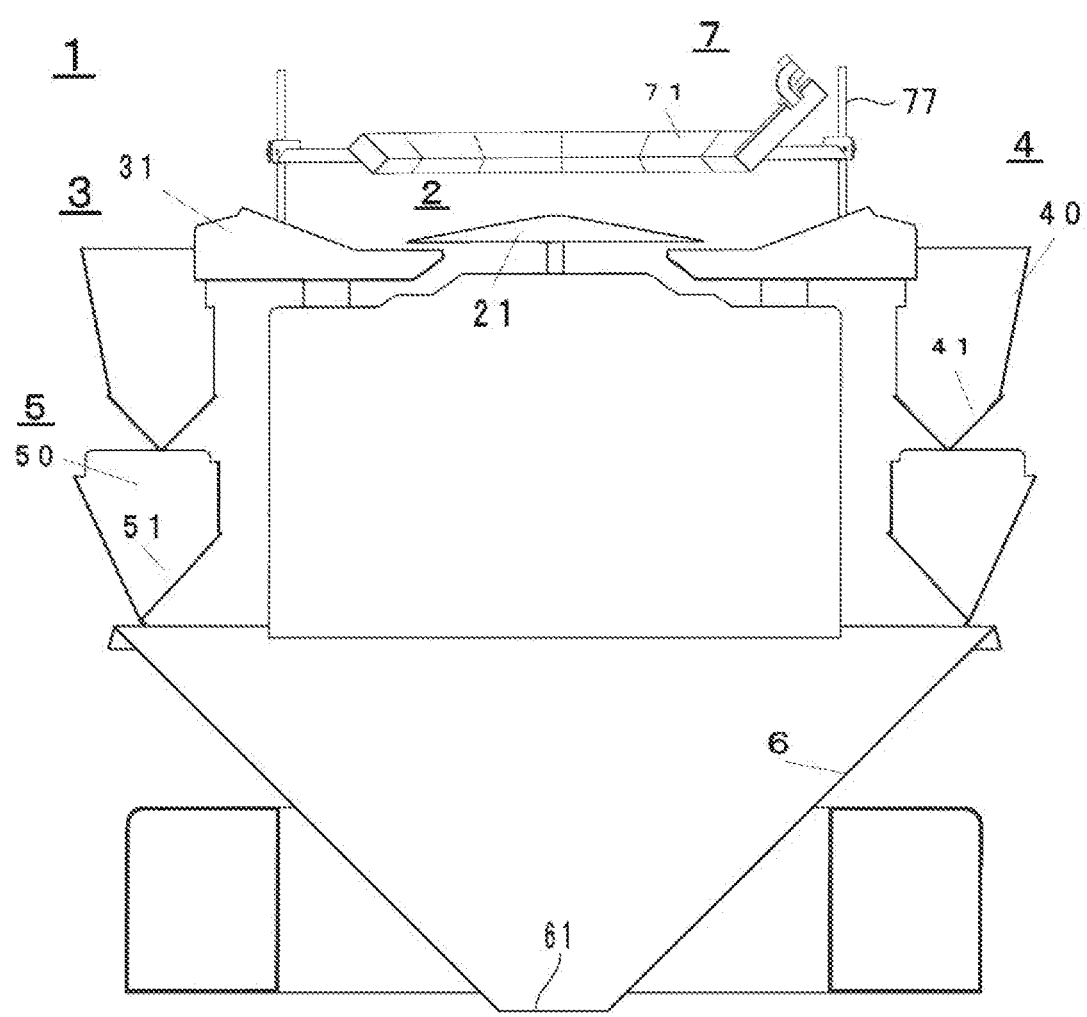
FIG. 1 is a schematic cross-sectional view illustrating a combination weighing apparatus according to an embodiment of the invention.
Figure 2:
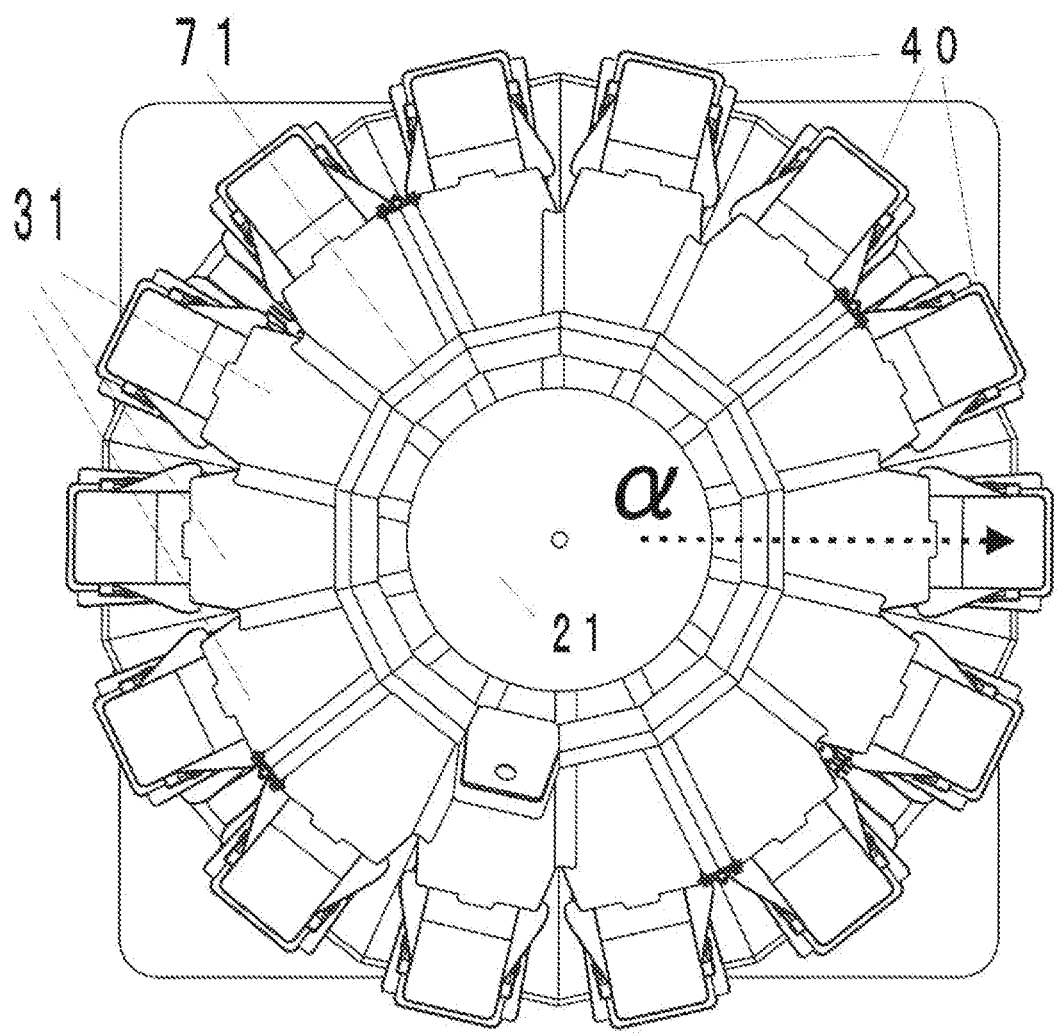
FIG. 2 is a schematic plan view illustrating the combination weighing apparatus illustrated in FIG. 1.
Figure 3:
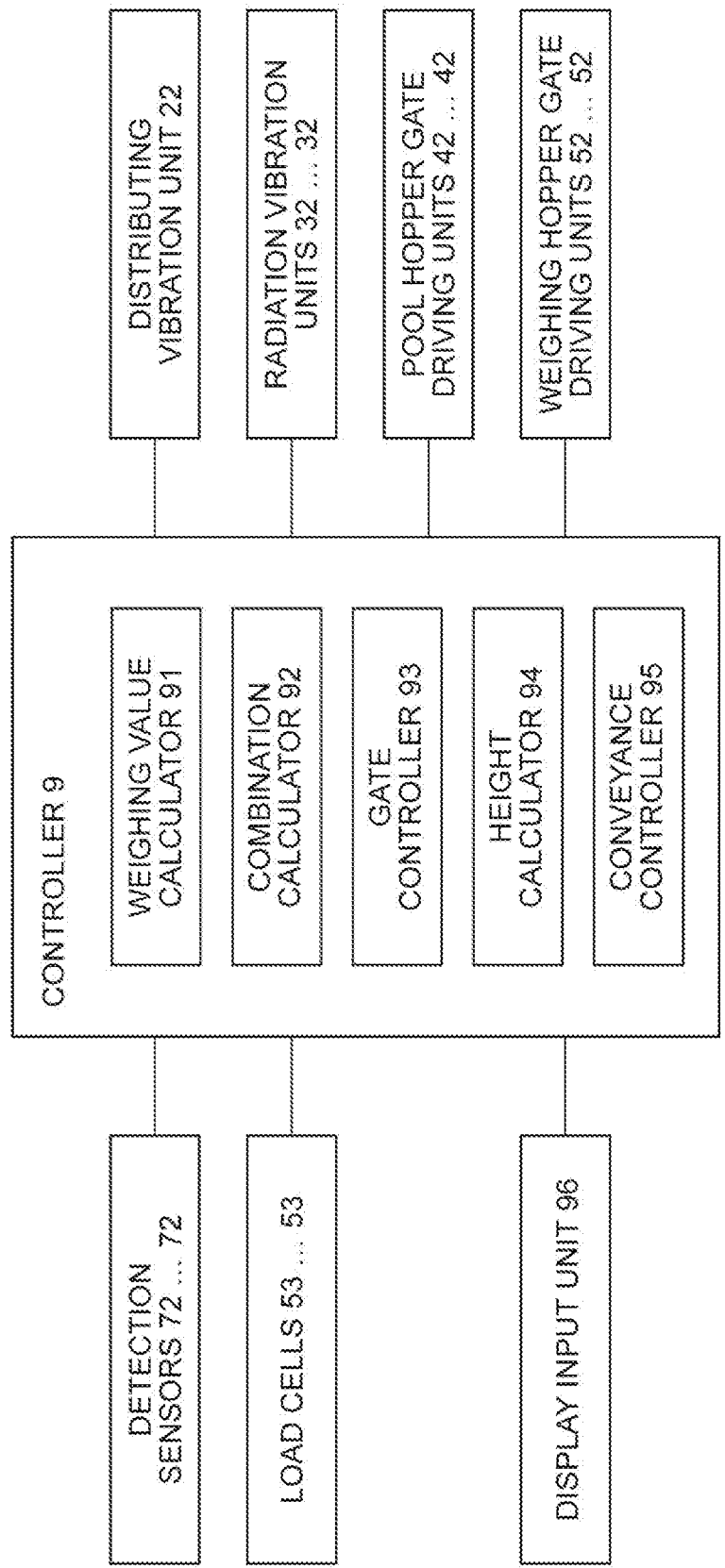
FIG. 3 is a diagram illustrating a controller of the combination weighing apparatus illustrated in FIG. 1.

As illustrated in FIG. 1 to FIG. 3, a combination weighing apparatus 1 includes a distributing unit 2, a radiation unit 3 radially disposed around the distributing unit 2, a plurality of pool hopper units 4 disposed below an outer peripheral portion of the radiation unit 3, a plurality of weighing hopper units 5 disposed below the pool hopper units 4, a collecting chute 6 disposed below the weighing hopper units 5, a detection sensor unit 7 disposed above the distributing unit 2, and an input chute 8 (not illustrated) disposed inside the detection sensor.

The distributing unit 2 includes a conical distributing table 21 and a distributing vibration unit 22 that vibrates the distributing table 21. In the distributing unit 2, articles are supplied to the distributing table 21 from above. The distributing unit 2 distributes and conveys the articles around the distributing table 21 by vibrating the distributing table 21.

The radiation unit 3 includes a radiation trough 31 and a radiation vibration unit 32 that vibrates the radiation trough 31. In addition, the radiation trough 31 has a conveying surface 33 (FIG. 4) for conveying an article m. A plurality of radiation units 3 is disposed around the distributing unit 2. In the present embodiment, for example, fourteen radiation units 3 are arranged in an annular shape when viewed in a vertical direction. An article conveying direction α of the radiation unit 3 is different for each of the radiation units 3. The articles distributed and conveyed by the distributing table 21 are supplied to the radiation trough 31. The radiation trough 31 conveys the articles in the article conveying direction α by vibrating.

Each of the pool hopper units 4 is disposed below the radiation unit 3 on a downstream side in the article conveying direction α for each of the radiation units 3. Each of the pool hopper units 4 includes a pool hopper-side wall 40 having an opening that opens in the vertical direction, a gate 41 that closes or opens the opening on a lower side of the pool hopper-side wall 40, and a pool hopper gate driving unit 42 that opens or closes the gate 41. The pool hopper units 4 temporarily accumulate articles conveyed from a downstream end portion β of the radiation trough 31. The downstream end portion β is an end portion of the radiation unit 3 on a downstream side in the article conveying direction α. The pool hopper unit 4 discharges articles to the weighing hopper unit 5 described below by opening the gate 41.

The weighing hopper unit 5 is disposed below the pool hopper unit 4 for each of the pool hopper units 4. Each of the weighing hopper units 5 includes a weighing hopper-side wall 50 having an opening which is open in the vertical direction, a gate 51 that closes or opens the opening on a lower side of the weighing hopper-side wall 50, a weighing hopper gate driving unit 52 that opens or closes the gate 51, and a load cell 53 connected to the weighing hopper-side wall 50. The weighing hopper unit 5 accumulates articles discharged from the pool hopper unit 4. The load cell 53 weights the articles accumulated in the weighing hopper unit 5.

The collecting chute 6 is disposed below the weighing hopper units 5. The collecting chute 6 collects articles discharged from a weighing hopper unit 5 selected by a combination calculator 92 of a controller 9 described below and discharges the collected articles from a discharge port 61 on a lower side.

The detection sensor unit 7 includes a sensor cover 71 and a plurality of detection sensors 72 . . . 72 incorporated in the sensor cover 71 and provided for the respective radiation units 3. The detection sensor unit 7 will be described in detail below.

The input chute 8 is disposed inside the detection sensor unit 7. The input chute 8 has a conical cylindrical upper portion and a cylindrical lower portion so that an article supplied from above on the upstream side is guided to a position around a center of the distributing table 21.

As illustrated in FIG. 3, the controller 9 includes a weighing value calculator 91, a combination calculator 92, a gate controller 93, a height calculator 94, and a conveyance controller 95.

The weighing value calculator 91 calculates weight values of articles weighed by respective load cells 53 . . . 53 as weighing values of the respective weighing hopper units 5.

The combination calculator 92 combines the weighing values of the respective weighing hopper units 5 calculated by the weighing value calculator 91 and selects a combination of the weighing hopper units 5 close to a target weight value.

The gate controller 93 drives pool hopper gate driving units 42 . . . 42 and weighing hopper gate driving units 52 . . . 52 to discharge articles in the respective pool hopper units 4 and the respective weighing hopper units 5. Specifically, the gate controller 93 drives a gate 51 of the weighing hopper unit 5 selected by the combination calculator 92 to discharge articles in the weighing hopper unit 5. Thereafter, the gate controller 93 drives a gate 41 of a pool hopper unit 4 disposed above the empty weighing hopper unit 5 to discharge articles in the pool hopper unit 4 to the weighing hopper unit 5 on the lower side.

The height calculator 94 calculates heights (that is, heights from the conveying surface 33) of articles conveyed in the respective radiation units 3 based on detection amounts of the detection sensors 72 . . . 72 provided for the respective radiation units 3.

The conveyance controller 95 controls driving of the distributing unit 2 and the radiation units 3 . . . 3 based on a height for each of the radiation units 3 calculated by the height calculator 94. Specifically, the conveyance controller 95 controls driving of the distributing unit 2 and the radiation units 3 . . . 3 using a conveyance amount (vibration intensity or vibration time) depending on the height calculated by the height calculator 94 such that a conveyance amount by each of the radiation units 3 approximates to a conveyance target weight set for each of the radiation units 3.

In addition, a touch panel serving as a display input unit 96 is connected to the controller 9 to allow display of various information or input of setting.

It is possible to obtain a product having a weight close to a target weight using the combination weighing apparatus 1 configured as described below.

[Detection Sensor Unit]

Figure 4:
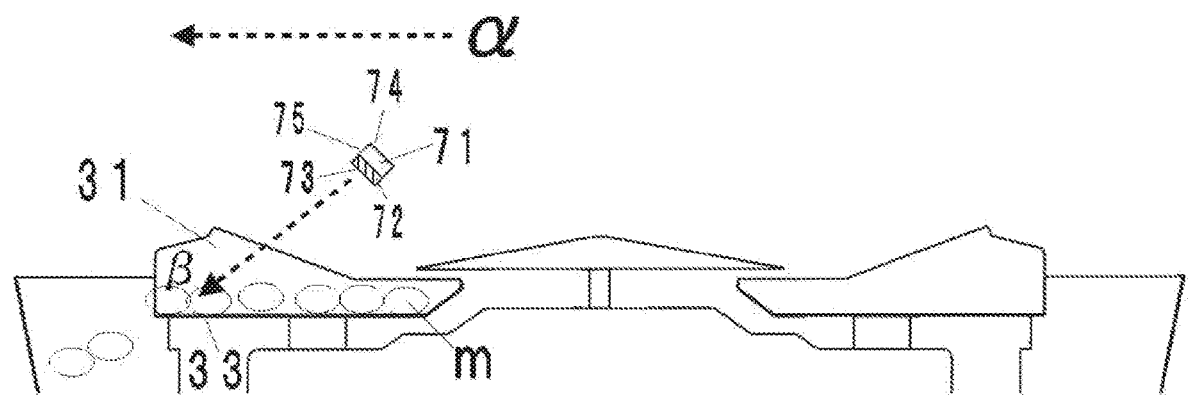
FIG. 4 is a schematic cross-sectional view illustrating a detection sensor unit.
Figure 5:
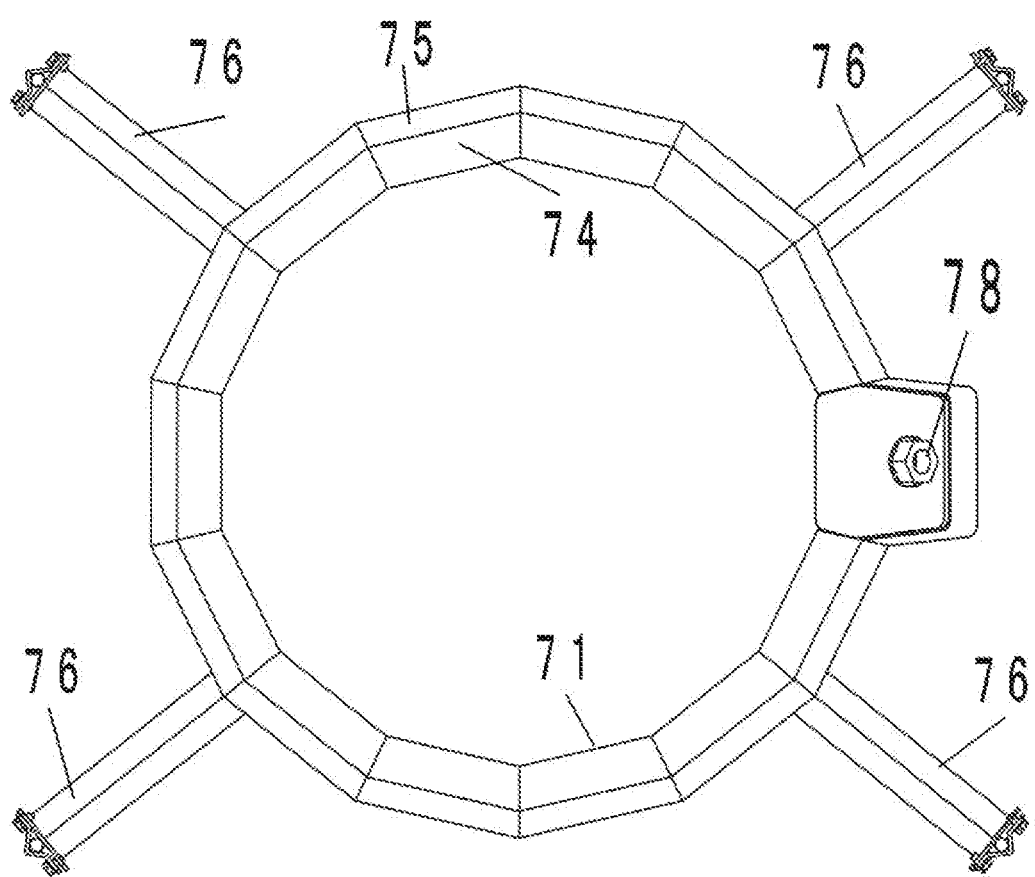
FIG. 5 is a schematic plan view illustrating the detection sensor unit illustrated in FIG. 4.

Hereinafter, the detection sensor unit 7 will be described with reference to FIGS. 1, 2, 4, and 5. As illustrated in FIG. 4, the detection sensor unit 7 includes the sensor cover 71 and the detection sensor 72 incorporated in the sensor cover 71. The sensor cover 71 has a hollow annular shape as illustrated in FIGS. 4 and 5, and is made of stainless steel. The sensor cover 71 is horizontally supported by four support frames 76. Each of the support frames 76 is connected to a support pole 77 (FIG. 1) provided along the vertical direction. As illustrated in FIG. 1, the support pole 77 is erected from a main body of the combination weighing apparatus 1 and extends in a horizontal direction. According to such a configuration, the sensor cover 71 is horizontally supported with respect to the conveying surface 33 of the radiation trough 31.

As illustrated in FIG. 4, the sensor cover 71 is disposed above the radiation trough 31 on an upstream side in the article conveying direction α. The radiation trough 31 has the downstream end portion β at which an article is put into the pool hopper unit 4 at the downstream side in the article conveying direction α. In this way, the sensor cover 71 is not disposed above the downstream end portion β, and a wide space is present. In other words, the sensor cover 71 is disposed at a different position from the downstream end portion β (a region not overlapping the downstream end portion β) when viewed in the vertical direction. For this reason, at the time of cleaning, the radiation trough 31 is easily removed, and the pool hopper unit 4 (the pool hopper-side wall 40 and the gate 41) or the weighing hopper unit 5 (the weighing hopper-side wall 50 and the gate 51) is easily removed. For this reason, cleanability is improved.

In the sensor cover 71, the detection sensor 72 is disposed on a lower surface side as indicated by a broken line in FIG. 4. As illustrated in FIG. 4, a detection surface 73 of the detection sensor 72 is inclined downward and attached to the sensor cover 71 to detect a portion around the downstream end portion β. In other words, the detection surface 73 is inclined with respect to the horizontal direction and faces the downstream end portion β side. In this way, because the detection surface 73 is inclined downward and attached to the lower surface of the sensor cover 71, an article is inhibited from directly coming into contact with the detection surface 73 even when the article is dropped from above. For this reason, contamination of the detection surface 73 is suppressed, and a reduction in detection accuracy is suppressed. Further, because a frequency of cleaning is reduced, cleanability is improved.

The sensor cover 71 has a first upper surface 74 and a second upper surface 75. The first upper surface 74 has a flat surface inclined downward to the upstream side in the article conveying direction α. In other words, the first upper surface 74 is configured as the inclined flat surface and faces the upstream side in the article conveying direction α. The second upper surface 75 has a flat surface inclined downward to the downstream side in the article conveying direction α. In other words, the second upper surface 75 is configured as the inclined flat surface and faces the downstream side in the article conveying direction α. A length of the second upper surface 75 in the article conveying direction α is shorter than a length of the first upper surface 74 in the article conveying direction α. Because the first upper surface 74 and the second upper surface 75 are inclined downward in this way, an article dropped from above is inhibited from staying on the sensor cover 71.

Further, the first upper surface 74 is inclined downward to the upstream side in the article conveying direction α, and thus guides the article dropped from above to the upstream side. For this reason, a conveying distance of the article increases, and thus stable conveyance is allowed.

Because the first upper surface 74 and the second upper surface 75 have the flat surfaces, a length of an outer wall of the sensor cover 71 is shortened when compared to a case in which the first upper surface 74 and the second upper surface 75 have outer walls (curved surfaces) of a round pipe that can accommodate the detection sensor 72 of the same size. For this reason, a length in which the article dropped from above comes into contact with the outer wall is shortened, and thus contamination rarely occurs, and cleanability is improved.

As illustrated in FIG. 2 and FIG. 5, the outer wall of the sensor cover 71 (the first upper surface 74 and the second upper surface 75) extends along a direction substantially orthogonal to the article conveying direction α when viewed in the vertical direction. In other words, each of portions corresponding to the respective radiation units 3 in the sensor cover 71 is substantially orthogonal to the article conveying direction α of the respective radiation units 3. For this reason, wires of the plurality of detection sensors 72 may be integrated.

As illustrated in FIG. 5, one wiring opening 78 is provided with the sensor cover 71. In the sensor cover 71, a signal line or a power supply line of the detection sensor 72 is wired at one position of this wiring opening 78. In this way, the number of disposed wiring openings 78 is smaller than the number of disposed detection sensors 72.

In this way, articles come into contact with or stay at fewer positions when compared to a case in which wires corresponding to the same disposition number as the number of disposed detection sensors are provided as in the past. For this reason, cleanability is improved.

An upper surface of the support frame 76 includes a flat surface inclined (inclined downward) with respect to the horizontal direction. A cross-sectional shape (a shape of a cross section orthogonal to an extending direction) of the support frame 76 is an inverted V shape. As a result, the article dropped from above is inhibited from staying on the sensor cover 71. In addition, because rigidity for supporting the detection sensor 72 is ensured, stable detection can be performed while suppressing deterioration in detection accuracy.

Modified Example A

In the above embodiment, the combination weighing apparatus having circular arrangement has been described. However, a combination weighing apparatus having so-called linear arrangement may be provided. In this case, cleanability is improved similarly to the above embodiment when the sensor cover 71 is disposed above the end portion of the radiation unit on the downstream side in the article conveying direction.

Modified Example B

In the above embodiment, the sensor cover 71 is disposed on the upstream side of the radiation unit in the article conveying direction. However, the sensor cover 71 may be disposed on the downstream side. In this case, cleanability is improved similarly to the above embodiment when the sensor cover 71 is disposed above the end portion of the radiation unit on the downstream side, that is, for example, the sensor cover 71 is provided in an annular shape on the outside of the main body of the combination weighing apparatus.

Modified Example C

In the above embodiment, the sensor cover 71 has the first upper surface 74 and the second upper surface 75. However, the sensor cover 71 may have only the first upper surface 74 or only the second upper surface 75. When the sensor cover 71 has the upper surface including the flat surface inclined downward, an article may be prevented from staying thereon.

Modified Example D

In the above embodiment, the wiring opening 78 is provided. However, the wiring opening 78 may not be provided, and signal communication and/or wireless power supply may be performed through radio communication. In this case, wiring is unnecessary, and thus cleanability is further improved.

Modified Example E

In the above embodiment, the input chute 8 is provided. However, the input chute 8 may not be provided, and a cylindrical tube may be provided below the first upper surface 74. In this way, cleaned places are reduced, and thus cleanability is improved.

Modified Example F

In the above embodiment, the outer wall of the sensor cover 71 (the first upper surface 74 and the second upper surface 75) includes the flat surface. However, the outer wall may include a curved surface. For example, the sensor cover 71 may include a round pipe. In this case, even though a cross-sectional shape becomes larger when compared to a case in which the outer wall includes the flat surface, space for wiring widens. Thus, more detection sensors 72 may be mounted.

Modified Example G

In the above embodiment, the detection surface 73 of the detection sensor 72 is exposed. However, the detection surface 73 may be covered with a transparent cover. Only a detection unit on the detection surface 73 may be exposed, and other portions may be covered with the sensor cover 71.

REFERENCE SIGNS LIST

1 . . . combination weighing apparatus, 2 . . . distributing unit, 3 . . . radiation unit, 4 . . . pool hopper unit, 5 . . . weighing hopper unit (weighing unit), 6 . . . collecting chute, 7 . . . detection sensor unit, 9 . . . controller.

The invention claimed is:

1. A combination weighing apparatus comprising:
a distributor that distributes articles supplied from above;
a plurality of radiation compartments that convey the articles distributed from the distributor;
a plurality of detection sensors disposed above the radiation compartments to detect the articles conveyed by the radiation compartments;
a plurality of weighing compartments disposed below the radiation compartments on a downstream side in an article conveying direction to accumulate and weigh the articles conveyed from the radiation compartments;
a controller that controls the distributor or the radiation compartments based on detection by the detection sensors; and
a hollow sensor cover that incorporates the plurality of detection sensors, wherein
the hollow sensor cover is disposed at a different position from an end portion of each of the radiation compartments on the downstream side when viewed in a vertical direction.

2. The combination weighing apparatus according to claim 1, wherein a detection surface of each of the detection sensors is disposed on a lower surface of the hollow sensor cover and inclined.

3. The combination weighing apparatus according to claim 1, wherein an upper surface of the hollow sensor cover is an inclined flat surface.

4. The combination weighing apparatus according to claim 3, wherein the hollow sensor cover is disposed on an upstream side with respect to the end portion on the downstream side of the radiation compartments in the article conveying direction, and the upper surface faces the upstream side.

5. The combination weighing apparatus according to claim 1, further comprising
a support frame supporting the hollow sensor cover, wherein
an upper surface of the support frame is an inclined flat surface, and a cross-sectional shape of the support frame is an inverted V shape.

6. The combination weighing apparatus according to claim 1, wherein the hollow sensor cover extends along a direction substantially orthogonal to the article conveying direction when viewed in a vertical direction.

7. The combination weighing apparatus according to claim 1, wherein
the hollow sensor cover extends along the direction substantially orthogonal to the article conveying direction when viewed in a vertical direction, and
the number of disposed wiring openings provided with the hollow sensor cover and through which wires connected to the plurality of detection sensors pass is smaller than the number of the disposed detection sensors.

8. A combination weighing apparatus comprising:
a distributor that distributes articles supplied from above;
a plurality of radiation compartments that conveys the articles distributed from the distributor;
a plurality of detection sensors disposed above the radiation compartments to detect the articles conveyed by the radiation compartments;
a plurality of weighing compartments disposed below the radiation compartments on a downstream side in an article conveying direction to accumulate and weigh the articles conveyed from the radiation compartments;
a controller that controls the distributor or the radiation compartments based on detection by the detection sensors; and
a hollow sensor cover that incorporates the plurality of detection sensors, wherein
the hollow sensor cover is not disposed above an end portion of each of the radiation compartments on the downstream side.

* * * * *